Figure 1:
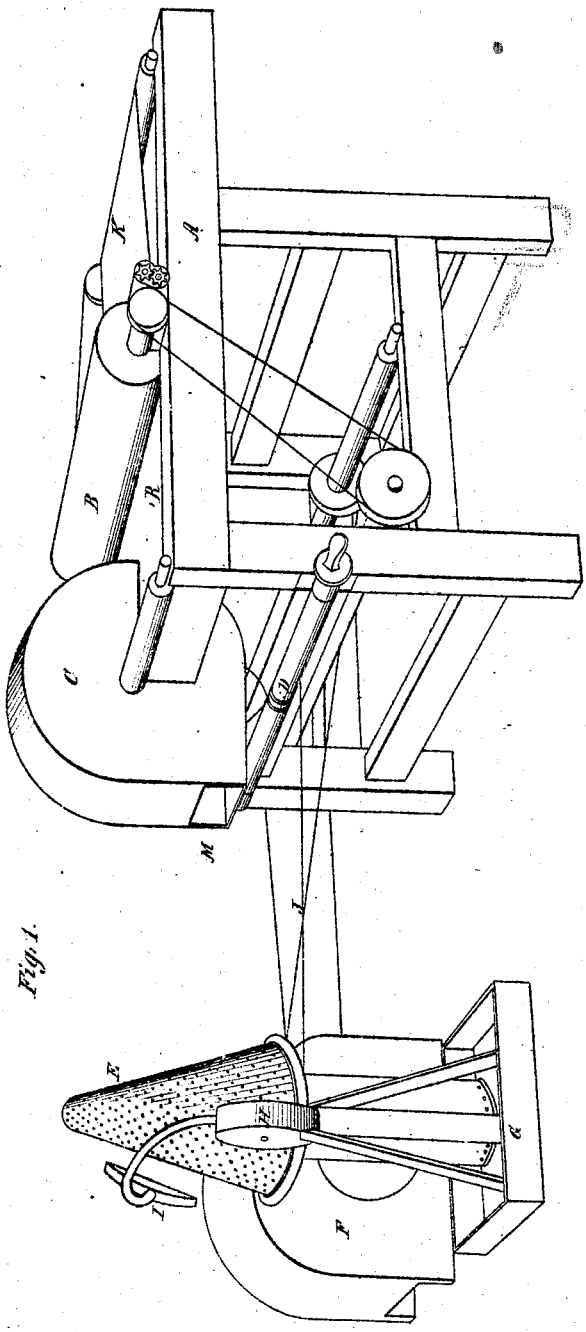

D. Barnum.
Forming Bats.
No 8195.   Patented Jul. 1. 1851.

UNITED STATES PATENT OFFICE.

DANIEL BARNUM, OF PHILADELPHIA, PENNSYLVANIA.

MACHINE FOR MAKING HAT-BODIES.

Specification of Letters Patent No. 8,195, dated July 1, 1851.

*To all whom it may concern:*

Be it known that I, DANIEL BARNUM, of the county of Philadelphia and State of Pennsylvania, have invented and applied to use new and useful improvements in machinery for opening and suspending fibrous materials in the air surrounding an exhausted and perforated former, and also for hardening the fibers by a combination of the means for producing a steady current of numerous small fine jets of water upon them, and thus commencing the felting process while they are held to and upon the cam by the pressure of air, caused by the currents passing into the exhaust, dispensing with the use of felted or fulled cloth or outer cones for the purpose of making pressure upon the fibers preparatory to the suspension of the pressure of the air, the whole operation being performed before the cone and fibers are removed from the exhaust; and I do hereby declare the following to be a full description of my improvements which I have endeavored to illustrate by referring to what was before known in this branch of the arts, and comparing and pointing out some of the important differences existing between them, reference being had to the accompanying drawings.

I will illustrate the nature of my invention by remarking that long experience has proved the small wire picker which is universally used in the common fur blower to be the best means, or instrument for opening the fibers of fur, and that the arrangements of the common fur blower consists of a feeding apron, feeding rollers and a picker with numerous small wire teeth placed within a chamber having an aperture under the picker for the admission of a current of air to aid in throwing the fibers into the chamber.

All attempts to construct a machine for making hat bodies by combining one or more sections of the common fur blower with the perforated exhausted cone have hitherto failed for the reason that the small wire teeth of the picker will not generate a current of air sufficient either in volume or velocity to suspend the fibers and to carry them through a chamber onto a perforated cone, distributing them through an aperture of the form and size of the cone as is the case with all chambers or trunks heretofore known.

Therefore the necessity for a strong current of air has hitherto caused the best means for opening the fibers to be abandoned and other means for producing a sufficient volume of air to be substituted for this purpose a fan without a casing, the wings of which act as a beater to remove the fibers from the cards, and to suspend them in air, was used and patented in England in 1833, and in 1840 the same inventor T. R. Williams made an application to the U. S. Patent Office, in which application a machine is described (but not claimed as invention) having a feeding apron, feeding rollers, a large picker cylinder with large spikes for teeth, and a chamber with an aperture under and back of the picker for the admission of a current of air to aid in throwing the fibers through the chamber, onto a perforated exhausted former placed at the outlet of the chamber which is of the size and shape of the former (see Fig. 2 of the drawing of said Williams patent). This machine is described as applicable to various kinds of manufacture, and in the canceled part of the specification, it is referred to, in connection with forming hats, and other irregular forms, with the remark, that when irregular formers are "placed in the situation of the cylinder *i*, it is not necessary to inclose the formers in casing as shown in the preceding figures" 1—2—3.

In 1846 a patent was granted to H. A. Wells for improvements upon this and other machines for making hats, which he declares to be applicable to "any shape or configuration" by substituting the required former, and changing the chamber, and hood to correspond—in this machine, a brush so arranged as to generate a strong current of air is substituted for the large cylinder in Williams' machine, and Wells' improvements, of the inclined aprons, and hinged hood and flap are added to the chamber. This patent also extends to the process, the patentee declaring that his invention consists in covering the hat with felted or fulled cloth—the object of which is to make pressure upon the fibers to hold them preparatory to the suspension of the pressure of the air, caused by the exhaust, and while they are immersed to harden. Wells' improvement in the process therefor consisting simply in the addition of the cloth, to Williams' application of the outer pressure or forms, for the same purposes of making pressure to hold the fibers while they are immersed. My improvements are contradistinguished from all these in various important particulars.

First I use the best known means for opening and separating the fibers of fur (to wit) the small bur picker of the common fur blower arranged and operated in the ordinary way, which has never been successfully used in a hat machine before, by which means I have effected a great improvement in the perfection with which the fibers are separated, and in the consequent evenness and beauty of the hat-body when completed; second, for the purpose of concentrating and suspending the fibers in the air surrounding the perforated cone or former I have combined with the chamber of the common fur blower into which the fibers are thrown by the picker, a small exhausting and suspending fan, which, by exhausting the chamber draws the fibers into itself, and at the same time, suspends them in the air surrounding the perforated cone in tangents, through a small opening in its own casing; third, the opening through which the fibers are suspended is adjustable as to its position in the circle, as the casing is so constructed as to have a vibrating motion around the center of the fan by which means the lines or tangents to the circle, when drawn through said opening and in which the fibers are suspended may be made to embrace any portion of the cone at pleasure thus securing perfect control over the distribution of the fibers, a desideratum not heretofore attained—the means which have been patented for that purpose being abandoned in practice; fourth, instead of placing the perforated exhausted cone on other former just in front of the opening in the casing as is done in the machines referred to above, for the purpose of receiving the fibers as they leave the aperture of the chamber which directs them on to the cone or other former, I place my exhausted cone at such distance as will allow the fibers to radiate in the lines or tangents in which they are thrown from the wings of the fan on to the desired portions of the cone according to the positions in the circle of the fan, in which the delivery opening, or aperture in the casing is placed, there being no chamber or trunk or tunnel or spout, between the suspending instrument—the fan and the cone, to direct, or in any way control the fibers after they are suspended by the fan; fifth, heretofore it has been indispensably necessary to apply some means to the fibers upon the cone to hold them preparatory to the suspension of the pressure of the air, in order to remove the cone and hat to harden it, for which purpose Williams applied outer forms—and Wells felt cloth applied in a particular way—and also with outer forms—instead of which I harden the hat while under the pressure of the air over the exhaust, using for that purpose a combination of means never before known.

Figure 3:
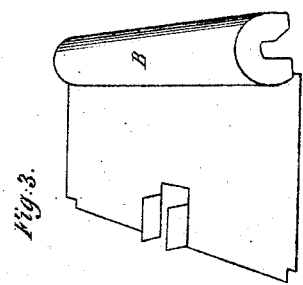
Figure 2:
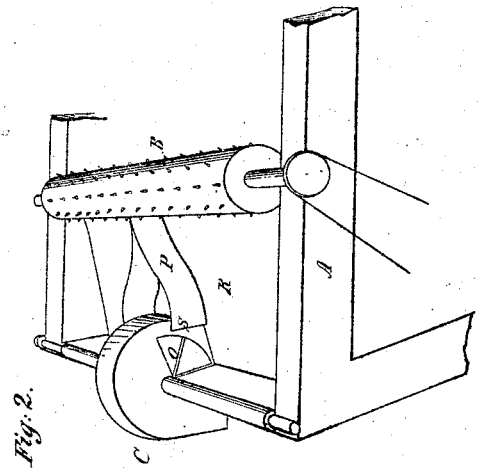

In the accompanying drawings Figure 1 is a perspective representation of the machine in combination with a perforated exhausted cone or former and also with the means for hardening and commencing the fitting process over the exhaust preparatory to the suspension of the pressure of the air, and the removal of the hat body from the cone, and Fig. 2 is a bird's-eye perspective view of the chamber, exhibiting the interior of the same, with the openings in the fan—the partition and picker—the top or cover being removed for that purpose as shown in Fig. 3, the letters in each figure referring to the same parts.

In Figs. 1 and 2 A represents the frame with the picker B arranged and combined with feeding rollers, and apron as seen at K, Fig. 1, and also with a chamber R (Figs. 1 and 2) with an aperture for the admission of air under the picker, the whole of the parts being arranged and operated, relatively, and collectively, as, and for the same purposes as those described by Thos. R. Williams in his application for a patent in 1840 except that his chamber extends to, and conducts the fibers on to the perforated exhausted form, or cylinder $i$, as described and shown in his specification and drawings, while in my machine the fibers are allowed to fall into the chamber, from which they are taken by the currents of air which are caused to pass from the aperture under the picker through the chamber into the fan $c$ which currents are induced by the exhaust action of the fan in receiving its supply of air, said currents being sufficient in volume and velocity to carry the fibers into the fan, and to suspend them in the air; by which means they are concentrated within the fan casing, from which they are suspended in the air, through the small square aperture or opening M, Fig. 1, in lines forming tangents to the circle made by the fan. These lines or tangents when drawn through said aperture M are made to embrace any portion of the cone or former E, Fig. 1, at pleasure. This may be done by making the whole casing adjustable so as to change the position of the aperture as shown in the drawings at D, Fig. 1, and also in the model, or, the position of the aperture M may be changed, by having that portion of the casing only, adjustable, which contains it—or, the same results substantially may be attained, by allowing the casing and aperture to be stationary, or permanent, and the cone or formers adjustable vertically; thus by raising or lowering it, any portions of its surface may be brought within the ranges or tangents, so that a perfect control over the distribution of the fibers is attained, without either chamber, trunk, hood, or flap, to direct them after they are suspended in the air, surrounding the exhausted former, or between it, and the fan c.

The perforated exhausted former E is placed in front of the aperture M about from two to three feet distant from it—or at such distance as will allow the lines or tangents as they radiate from the wings of the fan, to embrace from one half to two thirds—more or less—of the heighth of the former. This will allow of a sufficient change in the relative positions between the aperture M, and the former E, to cause the fibers to be drawn by the exhaust of the fan F upon any portion of the former E, to give the requisite proportions of the fibers upon any part of the hat body, as desired. The cone or former E has a slow-revolving motion, as seen at J, for the purpose of presenting in its revolutions the entire surface of the former to the ranges or tangents in which the fibers are suspended. F, Fig. 1, is an exhausting fan, having a rapid motion for the purpose of producing a partial vacuum under the perforated cone E. G, Fig. 1, is a square box, forming a reservoir of water which may be kept hot by steam, or otherwise, the exhausted former is placed over this reservoir, and the two are so arranged that a supply is furnished to wet the hat, and the surplus returned to the reservoir, so that no water or fuel to heat it is lost. H, Fig. 1, is a rotary force pump with a suction pipe connected with the water. I, Fig. 1, is a perforated sprinkler and flexible rubber hose attached to the pump H, the object of this part of the arrangement being to produce a steady current of numerous fine jets of hot water to wet the fibers on the former over the exhaust, and to commence the hardening and fitting process by the combination of currents of air, and water, with the fibers. These combinations produce new and beneficial results, and they are contradistinguished from all known modes of wetting and hardening and commencing the felting process, inasmuch, as the currents of air and water when they come in contact with the fibers and in their passage through them into the exhaust not only hold the fibers and wet them, thus dispensing with the trouble, and liability to damage resulting from the necessity hitherto existing of applying "some means" to hold the fibers preparatory to the suspension of the pressure of the atmosphere and of removing them, but they produce an actual working together of the fibers, under the pressure and motion caused by their rapid and combined action, in passing through the fibers into the exhaust, so that the felting process which can only be produced by motion of the fibers in contact, is actually commenced previous to the application of mechanical pressure, or manipulations, either by hand or machinery.

After the currents of air and water has performed their duties as above described of holding the fibers, of wetting, and by their combined action and motion commenced the hardening and felting process, it becomes necessary that the water should be taken away, to prevent washing the hat body. This duty is also performed by the currents of air, which is continuous, and which as soon, and as fast, as the surplus water passes through the fibers, carries said surplus through the perforations into the exhaust— thus securing the perfection of the operation and the realization of the practical benefits due to these improvements.

In Fig. 2, P, shows the triangular shaped partition which conducts the fibers from the picker to the openings in the fan casing, S, through which opening is seen one of the wings of the fan, O. The relative position of the fan C and cone E, with the chamber R and picker B may be changed so as to present only one side of the fan to the chamber, in which case there would be but one opening through the casing, and the triangular partition would not be required, and the fibers would be concentrated within the fan through one opening, and suspended at right angles to the line of motion of the picker, the perforated form being placed in the same relative position with the aperture M as before, the results and operations would be substantially the same.

R, Fig. 1, shows the chamber with the top or cover B, Fig. 3, in its place, and R, Fig. 2, shows the interior of the chamber, the cover B, Fig. 3, being removed for that purpose.

The success of my improvements in the process of wetting and hardening, and commencing the felting of the hat body, is entirely due to the discovery which I have made, that the currents of air not only hold the fibers while they are wet, but that they also aid the water in penetrating and saturating the fibers and that they also perform the further great and important duty, of removing the surplus water, which would otherwise accumulate under the fibers and wash them away. This would of course defeat the whole operation, but with this duty performed, the result is eminently beneficial and important both in the facility and ease of operation, as well as in the value of the hat body when finished, in consequence of the perfection of the work. This perfection is secured, from the perfect control which the operator has over the distribution of fibers, and from the absence of any and all liability to damage in the application of the cloth and water pressure to hold the fibers to immerse them, and in their removal after hardening.

As before remarked these improvements are contradistinguished from all other modes known of opening and suspending fibrous materials in the air, as well as from all known processes for hardening or wetting them upon the cone or former. No chamber, or trunk, or tunnel, gradually changed in form to a delivery aperture of the shape of the former, or near it in size, but higher, as was used by Williams in 1840, and by Wells in 1846 to concentrate the fibers, or to direct them onto the cone or former after they were suspended in the air, is used, nor is there any hood or flap to aid in the distribution of the fibers upon the cone or former used as claimed by Wells in 1846, nor is there any aperture nearly corresponding in shape and size with the former used, as described by Wells in 1846, and without which, it would be impossible to form a hat body on his machine, Wells declaring that his aperture must be higher than the cone, nor it is necessary that the aperture M which I use should be changed to suit any other former in order to form any other shape or size, a change which Wells declares in his patent to be necessary, when the shape or configuration is to be changed, nor is my former placed near the aperture, as is done in Wells' machine, and which can not be dispensed with, nor indeed can it be placed so, with success, as the absolute necessity exists, of its being placed at such distance as will allow the fibers to radiate in the lines or tangents, so as to embrace a portion of the former, much greater than the aperture M through which the fibers are suspended, these several differences between these improvements and others being clear and distinct on a comparison of the machinery for forming the hat body, without referring to the small wire picker to open the fibers in the best manner as compared with the large picker and brush to produce a current of air sufficient to suspend the fibers through a large chamber gradually changed to the size of the former, as was done by Williams and Wells. And in relation to the wetting and hardening process, no outer cones, or outer cones and cloth, as used by Williams in 1840, and by Wells in 1846, to make pressure preparatory to the suspension of the air, to hold the fibers while they are immersed to harden is used, nor is the cone and hat body, after the cloth is applied to make pressure to hold the fibers, immersed to harden as claimed by Wells in 1846.

Having thus fully described my inventions and pointed out some of the modes in which I contemplate using them, and having referred to what was previously known in this branch of the arts in order that my invention may be the better understood, I do hereby declare that I do not claim the combination of a picker and chamber having an aperture for the admission of air, such a combination having long been known and used for opening and cleaning the fibers of fur, nor do I claim the combination of these, with a perforated exhausted former, such a combination having been described and referred to as applicable to forming hats, and other irregular forms in an application for a patent by T. R. Williams in 1840, though it was not then claimed as invention. Nor do I claim the use of water to harden, or to wet the hat body, such use being as old as the felting process, and is indispensably necessary, in all hardening and felting processes. Nor do I claim the hardening of a hat body on a cone, such a process having been described and patented to Wells, James, and Peck, 1837, they using a solid cone upon which a web was wound to form the body and numerous jets of steam was used to harden the same or to wet it, as it was wound on the cone, there being no exhaust, and processes for hardening bodies on a perforated cone have also been described, in 1840 by Williams and by Wells in 1846, they both using outer pressure to hold the fibers, while the cone and fibers are immersed, nor do I claim any of the parts as my invention except as they are used in new combinations and producing new and important results; but

What I do claim as my invention and desire to secure by Letters Patent of the United States is—

1. The exhausting and suspending fan C with its casing and aperture M, constructed, arranged, and operated, substantially as, and for, the purposes hereinbefore particularly described, in combination with the picker B, chamber R, perforated exhausted former E, and exhaust fan F, arranged substantially as described and shown, by which arrangements and combinations, the several parts or their equivalents, perform their several, and combined functions in a better manner, and produce better results than has been heretofore attained, without any chamber, trunk, or tunnel or any other means, to control the fibers after being suspended in the air by the fan, or between the fan and perforated exhausted cone or former, substantially as described and shown.

2. I also claim the combined action of the currents of air, and the currents of numerous jets of hot water in the hardening or wetting process, the currents of air performing the triple duty of holding the fibers on the former, and of aiding the water to penetrate the hat body, and at the same time to carry the surplus water through the perforations into the exhaust, thus effectually preventing injury to the hat body from the accumulation of the surplus water, to wash it, while the wetting or hardening process is greatly facilitated and the perfection of the work is secured, the whole process, being accomplished by the combination of the several parts named, or their equivalents, for producing the currents of air and water, with the perforated former over the exhaust, in the manner and for the purposes, substantially as herein described and shown.

The effect of these improvements are the production of a machine combining the best means for opening fibrous materials and suspending them in the air surrounding a perforated and exhausted former, and also of a new combination of means for hardening the fibers and completing the process without removing the hat or applying any pressure preparatory to the suspension of the pressure of the air, by which means a great improvement is effected, as well in the forming of the hat, and in the process of hardening, as in the facility of operation. The whole being by combinations of machinery heretofore unknown.

DANIEL BARNUM.

Witnesses:
OLIVER S. BARNUM,
EMILY A. BARNUM.